Aug. 11, 1964    A. M. KLUGE    3,143,750

BINDING FOR WATER SKIS

Filed April 22, 1963    5 Sheets-Sheet 1

INVENTOR
ANTHONY M. KLUGE
BY
ATTORNEY.

Aug. 11, 1964  A. M. KLUGE  3,143,750
BINDING FOR WATER SKIS
Filed April 22, 1963  5 Sheets-Sheet 2
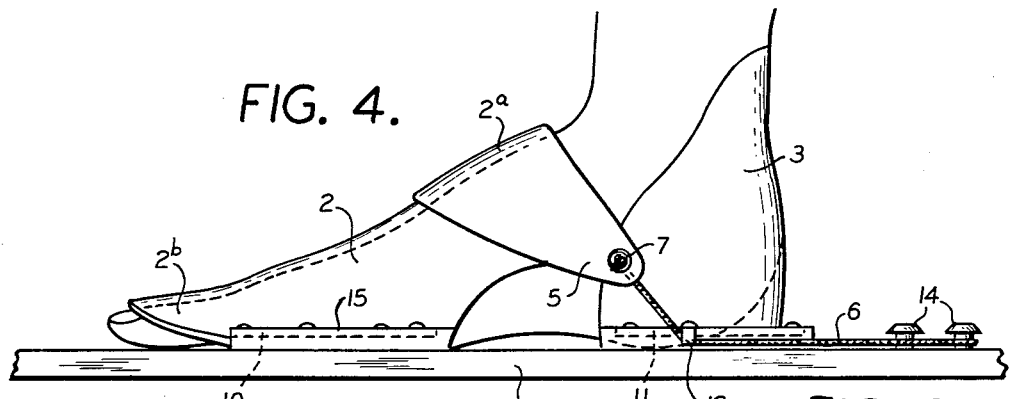
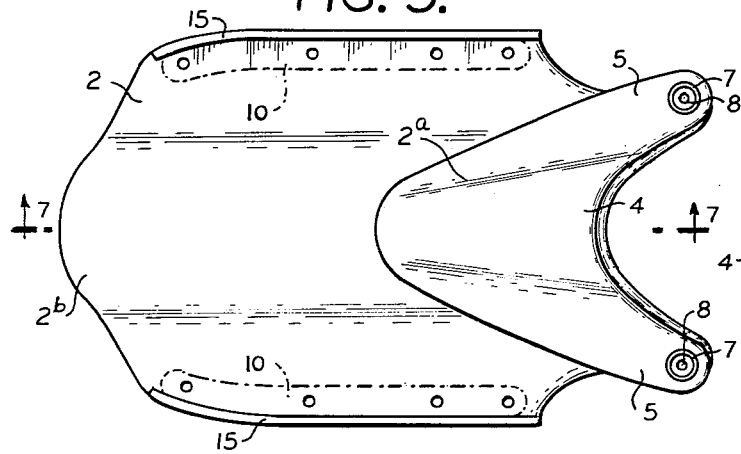
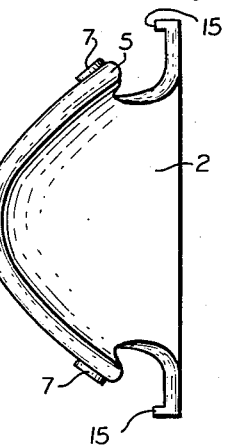
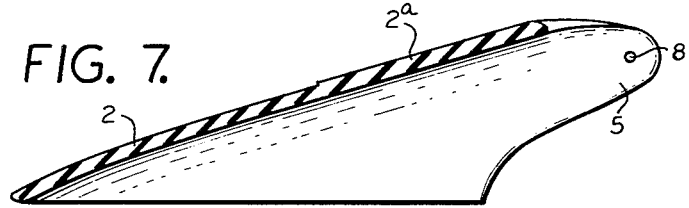
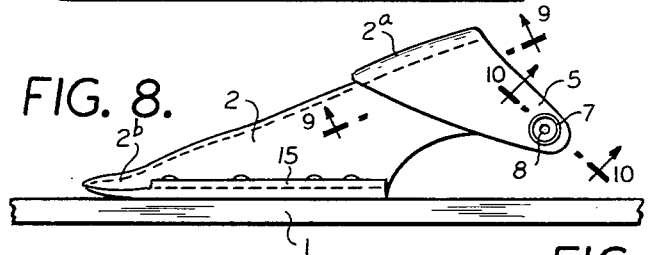
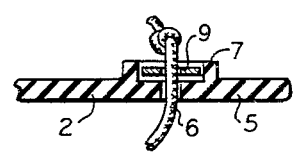
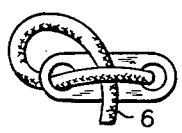
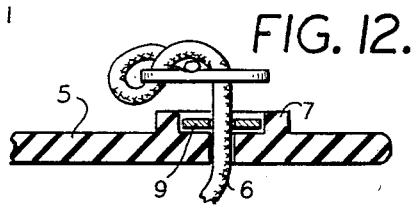
INVENTOR
ANTHONY M. KLUGE
BY
ATTORNEY.

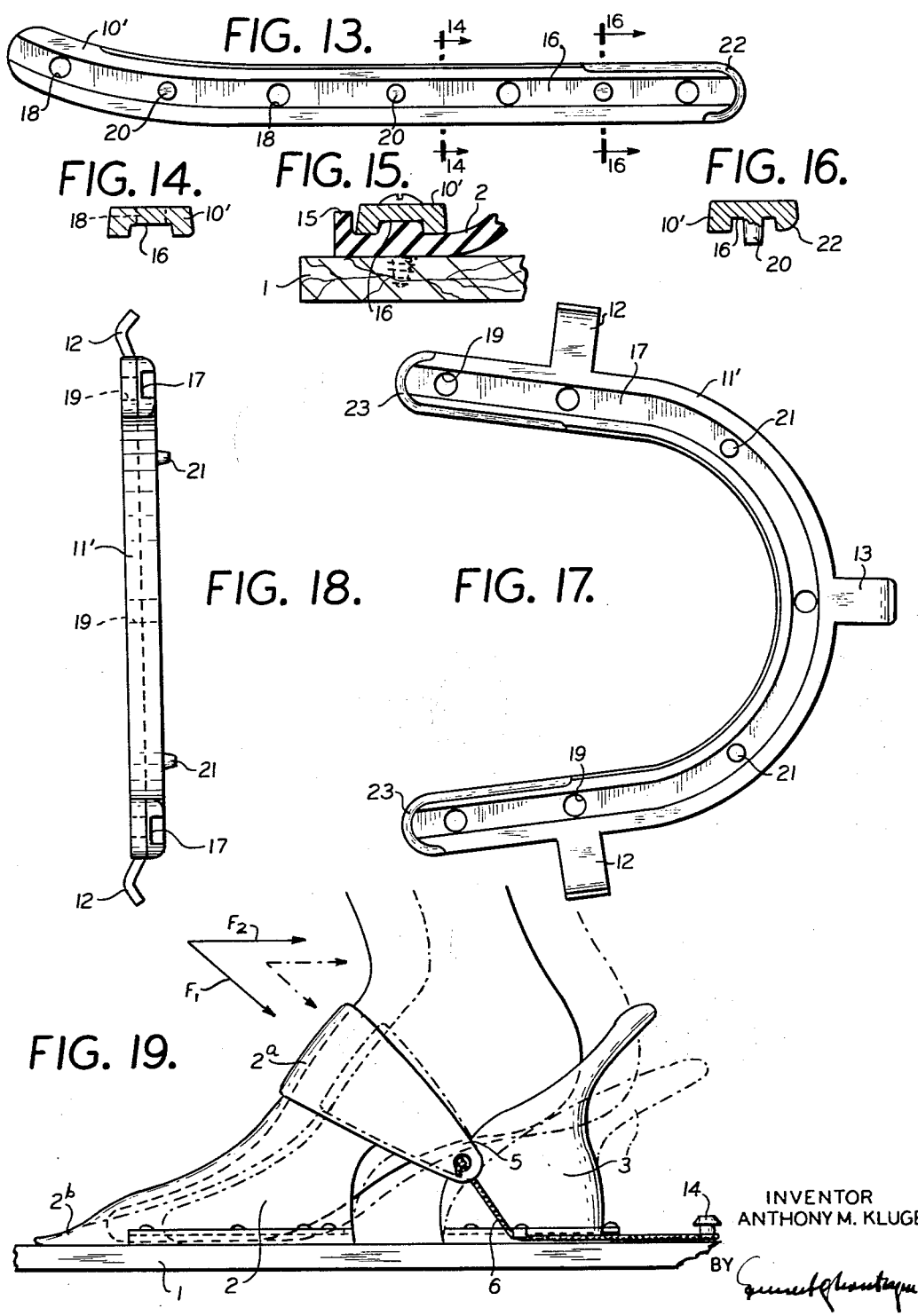

Aug. 11, 1964 A. M. KLUGE 3,143,750
BINDING FOR WATER SKIS
Filed April 22, 1963 5 Sheets-Sheet 4
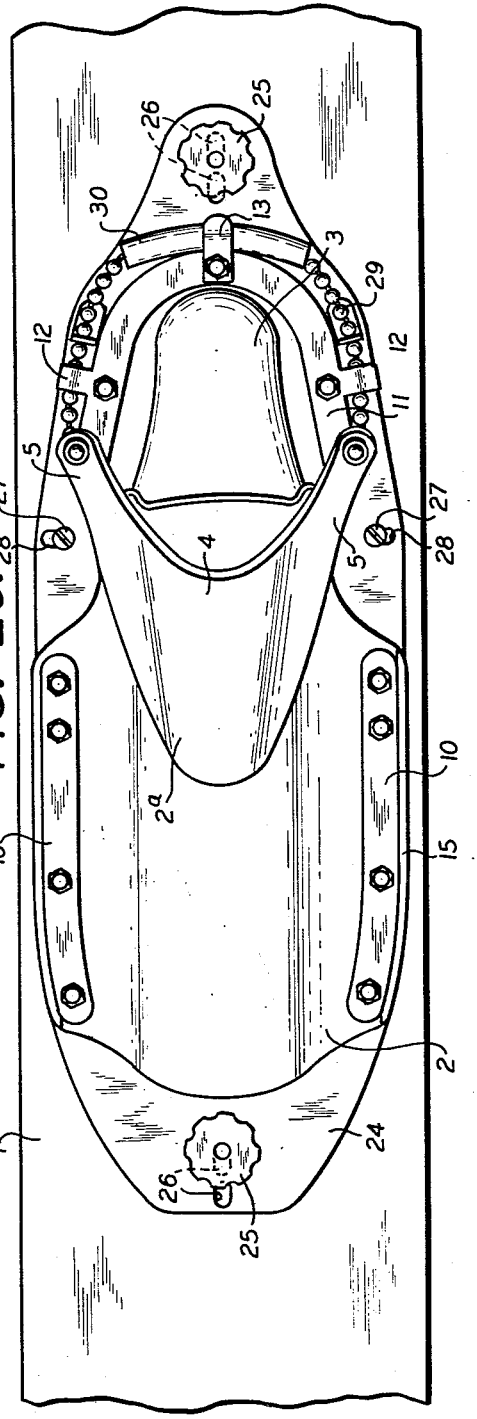
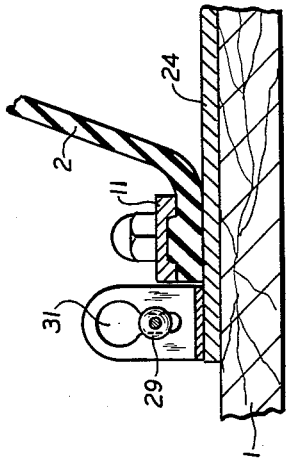
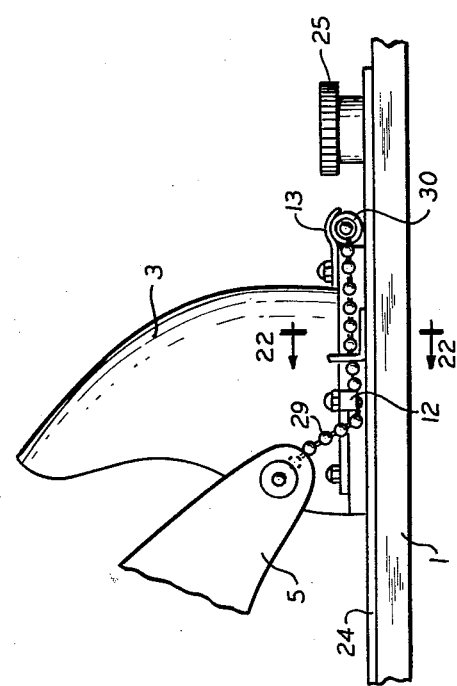
INVENTOR
ANTHONY M. KLUGE
BY
*Ernest R. Montague*
ATTORNEY.

Aug. 11, 1964  A. M. KLUGE  3,143,750
BINDING FOR WATER SKIS
Filed April 22, 1963  5 Sheets-Sheet 5

INVENTOR
ANTHONY M. KLUGE
BY
ATTORNEY.

United States Patent Office 3,143,750
Patented Aug. 11, 1964

3,143,750
BINDING FOR WATER SKIS
Anthony M. Kluge, 62—24 78th St., Rego Park, N.Y.
Filed Apr. 22, 1963, Ser. No. 274,660
12 Claims. (Cl. 9—310)

The present invention relates to a binding for water skis, and in particular to such binding which permits easy adjustment thereof for any foot length.

In applicant's prior Patent No. 2,974,330, dated March 14, 1961, a water ski is disclosed, which comprises a ski board and a binding to be mounted on the ski board, the binding comprising an elastic, flexible vamp member, a counter, clamping menas securing the lateral edges of the vamp member and of the counter to the ski board, a heel plate having two fork-like front portions and means securing the lateral sides of the counter to the heel plate. The heel plate has parallel lateral edges which are widened at their front portion to provide abutment means during the rearward movement of the heel plate. Furthermore, guide means are disposed at each side of the lateral edges of the heel plate for guided longitudinal movement of the heel plate on the ski board and the heel plate has a raised portion starting adjacent its front and extending spaced apart from the ski board to the rear end thereof in its inoperative position.

While the described binding for water skis brings about advantages over the conventional bindings, it has been found that there is still a requirement for easier adjustment, better security and quicker release of the water ski in case of falls or whenever such quick release is required.

It is, therefore, one object of the present invention to provide an adjustable water ski binding, which is capable of accommodating various foot sizes and at the same time provides an easy adjustment, a greater security and comfort and also permits quicker release than it was possible with the known structures.

It is another object of the present invention to provide an adjustable water ski binding, which brings about the advantages set forth above, without the use of levers, ratchets, springs, nuts, bolts and sliding parts, which parts can jam tight and, thereby, render it inoperative.

It is still another object of the present invention to provide an adjustable water ski binding, the vamp member of which is of greater thickness at the point of greatest tension, and wherein the vamp member is equipped at the portion of greater thickness with tension projections, which are secured in position by means of a non-elastic cord or by a ball-chain.

With these and other objects in view, which will become apparent in the following detailed description, the present invention will be clearly understood in connection with the accompanying drawings, in which:

FIG. 4 is a side elevation of the ski binding shown in FIG. 3, yet in operative position;

FIG. 5 is a top plan view of the vamp member alone;

FIG. 6 is an end view of the vamp member shown in FIG. 5;

FIG. 7 is a section along the lines 7—7 of FIG. 5;

FIG. 8 is a side elevation of the vamp member mounted on a ski board;

FIG. 9 is a section along the lines 9—9 of FIG. 8;

FIG. 10 is a section along the lines 10—10 of FIG. 8;

FIG. 11 is a top plan view of the cord locking and adjusting device;

FIG. 12 is a section through the vamp receiving the cord locking means;

FIG. 13 is a top plan view of a clamping plate for the vamp member;

FIG. 14 is a section along the lines 14—14 of FIG. 13;

FIG. 15 is a section of the mounting means of the clamping plate on the ski board;

FIG. 16 is a section along the lines 16—16 of FIG. 13;

FIG. 17 is a top plan view of the clamping plate for the counter;

FIG. 18 is an end view of the clamping plate shown in FIG. 17;

FIG. 19 is a side elevation of the water ski binding indicating the engaging forces for releasing the foot therefrom;

FIG. 20 is a top plan view of a second embodiment of the water ski binding;

FIG. 21 is a fragmentary side elevation of the binding shown in FIG. 20;

FIG. 22 is a section along the lines 22—22 of FIG. 21;

Figure 1:
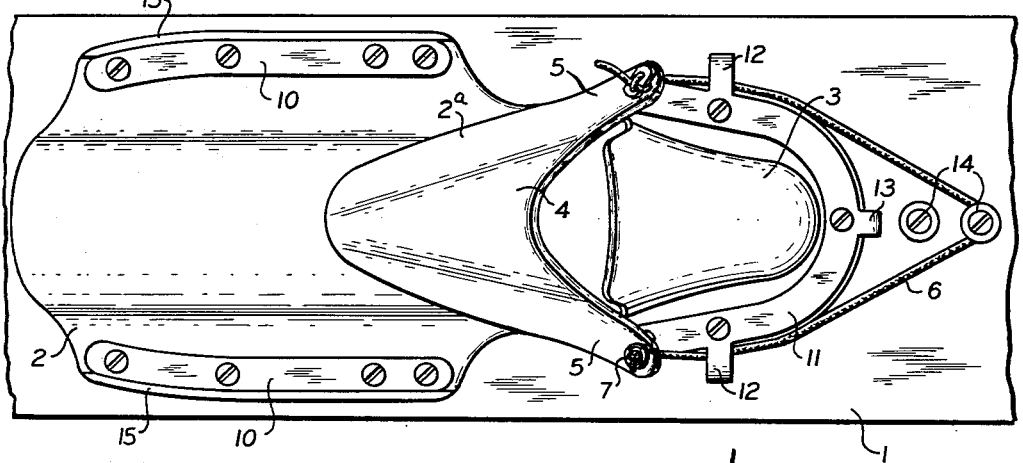
FIGURE 1 is a top plan view of a first embodiment of the water ski binding designed in accordance with the present invention.

Referring now to the drawings, and in particular to FIGS. 1 to 4, the ski board 1 has mounted on its top face a vamp 2 and a counter 3.

The vamp 2 is preferably made of a flexible, elastic, rubber-like material, which has a cut-out portion 4 at the center of its rear end, in order to avoid the usually experienced pressure on the extended rear edge of the vamp.

The counter 3 is made of a sheet-like or rubber-like material, which is secured to the rear part of the binder in such manner, that it stands up from the surface of the ski board 1.

The vamp 2 has two integrally extending tension projections 5 on the opposite sides of the cut-out portion 4. The tension projections 5 are equipped at their extreme ends with an opening 8 to receive therein a non-resilient cord 6.

As particularly clearly shown in FIGS. 5–8, the vamp 2 has a portion 2ª constituting a raised portion of the vamp 2 across the instep and extending into the lateral tension projections 5. The purpose of the portion 2ª of greater thickness is to provide at the point of greatest stress, namely at the point of the instep, an increased resistance and a better engagement between the vamp 2 and the foot of the user of the water ski.

The lateral tension projections 5 are provided with a raised annular reinforcing ring 7 surrounding concentrically the openings 8 of the tension projections 5, which receives a non-resilient cord 6. This reinforcing ring 7 provides a greater resistance at the point, where the non-elastic cord 6 exerts a stress on the tension projections 5. A washer 9 (FIGS. 11 and 12) is placed into the circular recess formed by the reinforcing ring 7. The washer 9 prevents the non-resilient cord 6, which has been knotted at that end from slipping through the opening 8 of the resilient material and increases the engaging area on the ends of the tension projections 5 in their engagement with the knotted end of the cord 6.

One of the two tension members receives the knotted end of the cord 6, as well as the washer 9, while the opposite tension member 5 receives the other end of the non-elastic cord 6, as well as a washer 9 disposed in the reinforcing ring 7, and in addition, is equipped with any conventional means to adjust the length of the cord at the point of the opening end of the opposite tension projections 5, for instance a metal plate having two slots through which the cord is threaded, thereby permitting adjustment of the operative length of the cord 6. It is to be understood, however, that the locking or adjusting means is not necessarily applied on one tension projection 5 only, rather it could be applied to both tension projections 5 or anywhere intermediate the ends of the non-elastic cord 6.

Figure 2:
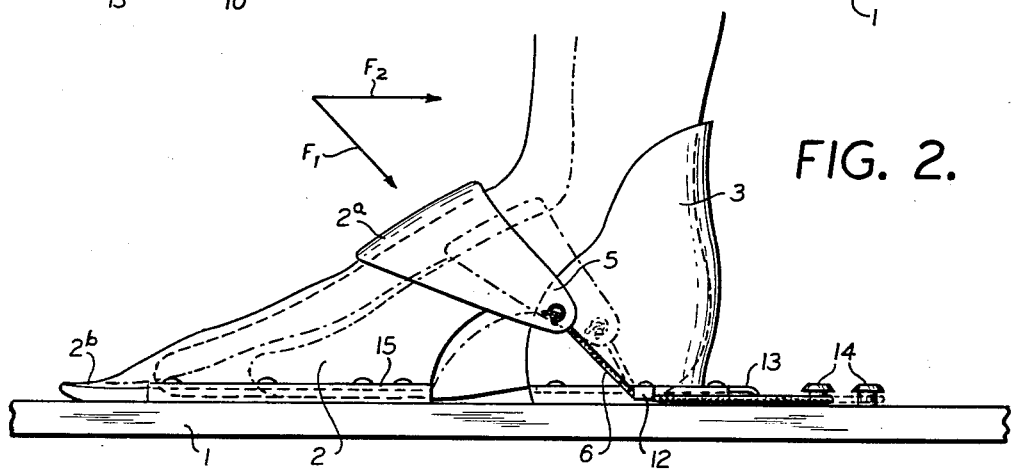
FIG. 2 is a side elevation of the water ski binding shown in FIG. 1.
Figure 3:
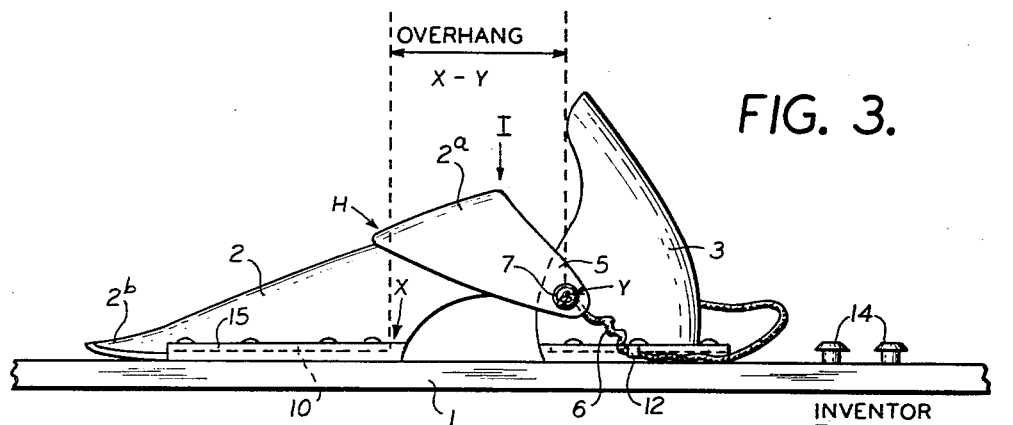
FIG. 3 is a side elevation of the water ski binding, shown in inoperative position.
Figure 23:
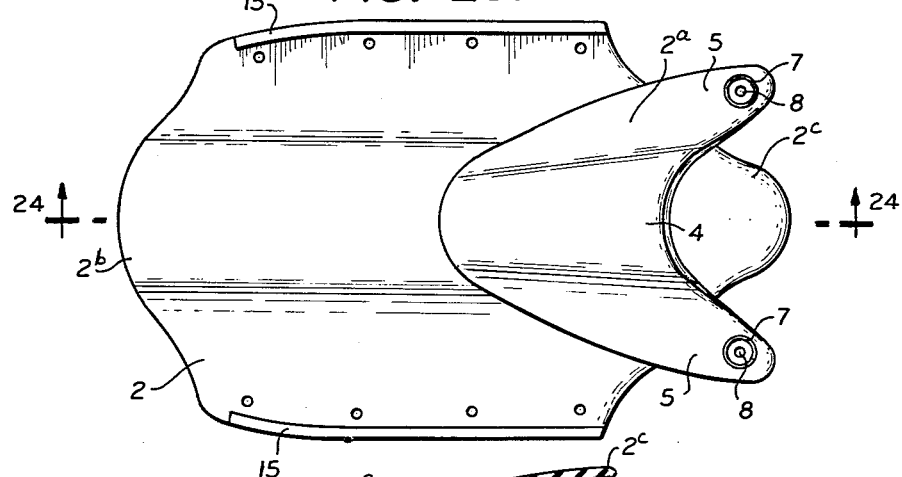
FIG. 23 is a top plan view of another embodiment of the vamp member.
Figure 24:
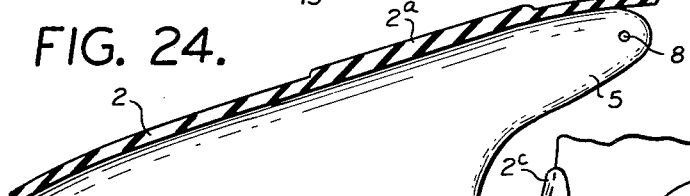
FIG. 24 is a section along the lines 24—24 of FIG. 23.
Figure 25:
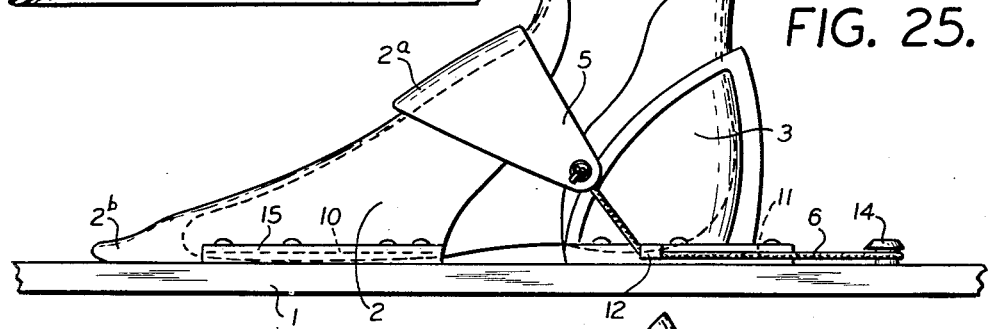
FIG. 25 is a side elevation of the water ski binding in connection with the vamp shown in FIG. 23, in operative position.
Figure 26:
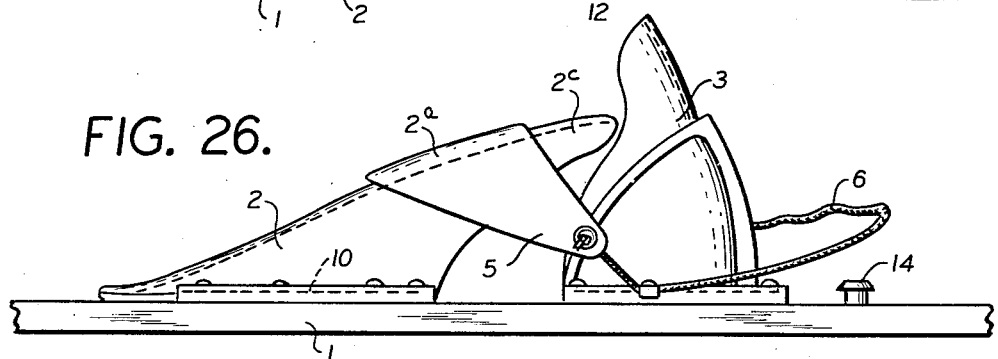
FIG. 26 is a side elevation of the water ski binding shown in FIG. 25 in inoperative position.

Referring now particularly to FIG. 2, it should be emphasized that the increased thickness of the vamp 2 by the thicker vamp portion 2ª across the instep, provides a greater strength at the area, where the forces $F_1$ and $F_2$ are applied. The force $F_1$ is directed substantially perpendicularly towards the instep, while the force $F_2$ is applied towards the leg or the shin bone. The area, in which the force $F_1$ is applied, is the main area at which the binding holds to the foot and thus, must have the greatest holding power, while the remaining portion, which is of lesser thickness than the thicker portion 2ª, provides sufficient flexibility, in order to conform more readily to the individual contour of the foot, thereby giving sufficient holding power without interfering with the comfort of the foot.

A clamping plate 10 disposed on the lateral sides of the vamp 2, secures the vamp to the ski board 1, while a substantially U-shaped clamping plate 11 secures the rear portion of the counter 3 to the ski board 1 in a similar manner. The area, at which the clamping plates 10 and 11 engage the vamp 2 and the counter 3, respectively, is of thinner material and permits the necessary stretching of the vamp 2 and of the counter 3, in order to adjust the counter to the individual contour of the foot. While, thus the rear end of the clamping plate 10 engages the vamp 2 at a fixed point $x$, from this point the vamp can be stretched rearwardly along the portion of thinner material up to the portion 2ª, which will exert then the necessary holding force to the instep of the user's foot in a proper manner at the proper location of the foot or of the instep thereof. The sufficient distance between the fixed point $x$ and the portion of greater thickness 2ª permits a sufficient stretching in order to put the portion 2ª of greater thickness into the right position of the instep. If the user of the water skis raises his heel, the greater portion of the force across the instep is mainly transferred to the tension projections 5 to be applied at the point $y$, namely at the engaging point with the non-resilient cord 6. In view of the non-resiliency of the cord 6, the point $y$ is immovable and, thus, constitutes a second point of security for the location of the binding. It is, thus apparent that the points $x$ and $y$ are fixed points, which cannot be moved regardless of the size or contour of the foot of the user. Such arrangement reduces also the danger of tearing of the vamp at the point $x$.

Thus, the vamp 2 is equipped with a large rearwardly overhanging portion starting from the point of security $x$ and extending to the second point of security $y$. The comparatively long overhang $x$—$y$ (FIG. 3) is of sufficient length, in order to permit the required extensibility of the vamp in rearward direction, since the only resistance encountered for such movement is the resiliency of the thinner portion 2 of the vamp.

Due to the adjustability of the non-resilient cord 6, the vamp can be conformed to the various shapes and heights of the insteps of different users and permits the use of the same water ski binding for larger, as well as for smaller feet. In this connection, it should be emphasized that upon shortening the cord 6 to fit a smaller foot, the vamp 2, and in particular the thicker portion 2ª thereof, is not only pulled downwardly, but also rearwardly towards the counter 3, thereby narrowing the distance between the vamp 2 and the counter 3, as clearly shown in dotted lines in FIG. 2 of the drawings.

In order to adjust the water ski binding disclosed in FIGS. 1 and 2 to a particular foot of the user, the foot is inserted, while the cord 6 is in its loose position. The vamp 2 is then pulled downwardly and rearwardly until it engages the instep of the user. The maximum force to hold the foot and, thereby, the heel down on the ski board 1 is exerted over an area of the rear portion of the vamp 2 extending rearwardly from about the point H, which is the forwardmost point of the thicker portion 2ª of the vamp 2, to about the point I, which is the rearmost point of the thicker portion 2ª of the vamp 2. Due to the tension projections 5, the thicker portion 2ª of the vamp 2 is wrapped around the instep of the foot of the user.

In order to provide guide means for the cord 6, the clamping plate 11 is equipped with at least two oppositely disposed lateral projections 12 and at least one rearward projection 13, which projections can serve as guide means for the cord 6, since the cord is threaded below the projections 12 and preferably at least two bolts 14 are disposed spaced apart from and behind the clamping plate 11, to provide means for leading the cord 6 rearwardly from the clamping plate 11 and from the counter 3. In order to increase the engaging force of the thicker portion 2ª of the vamp 2, with the instep of the foot of the user, it is merely necessary to shorten the cord and the thicker portion 2ª will then engage more tightly the foot of the user. This adjustment is also possible due to the elastic properties, particularly of the front portion of the vamp 2.

If a skier falls, the heel of the foot is raised and also, if a skier wishes to drop off one ski to continue his skiing on one ski only, he likewise raises the heel to remove the second ski. In order to bring about such a removal of the ski, the heel must be raised to a point, where the counter 3 ceases to hold the heel against backward movement. At the same time, the instep exerts greater pressure against the thicker portion 2ª of the vamp 2 and also brings about a yielding of the resilient elongated tension projections. Upon exerting a force by the heel in the direction of the arrow of the force $F_2$, the foot can now be easily removed from the binding. Due to the greater force $F_1$ brought about by raising the heel of the foot of the user, this greater force will contribute to a faster ejection of the foot in the direction of the force $F_2$ and it is, thereby, clearly visible that the present structure with the arrangement of the thicker portion 2ª, not only brings about a better holding of the foot in the binding in the normal skiing operation, but performs as a second function also an accelerated ejection means of the foot, if required or desired.

It is shown in FIG. 5 of the drawings, that the vamp 2 is equipped with a bead 15 at the opposite lateral edges thereof, which beads are disposed parallel to and outside of the clamping plates 10. The bead 15 is, however, not continued towards the front edges and the rear edges of the vamp 2. By such arrangement, a greater resiliency is brought about at the front and the rear edges of the vamp 2.

In accordance with a variation of the vamp structure, as shown particularly in FIG. 4 of the drawings, the vamp 2 is extended forwardly beyond the front end of the clamping plates 10, which front end is left open and permits the toe extending beyond the front end of the vamp 2. The forwardly extending portion 2b of the vamp 2 adds to the flexibility of the vamp 2 and contributes to the comfort of the user of the binding of the water ski. The front edge portion 2b has at its forward end a proper circular contour to prevent cutting of the front edge into the toes of the user of the skis, if, due to the particular shape of the foot of the user, the toes extend beyond the vamp 2. The rearmost portions of the clamping plates 10 and the foremost portions of the clamping plate 11 have an inner curved edge portion of a greater diameter than that of the remaining inner edge portions.

The tension projections 5 also contribute to an easier insertion of the foot into the water ski binding, since these tension projections 5 lend themselves to be gripped by two hands of the user and, thereby, the sliding in of the foot is extremely simplified. In this connection it should be emphasized, that in known structures, the fingers of the user had to be inserted between the vamp and the foot of the user, which made the same operation rather difficult, while it is extremely simplified due to the rear extensions of the tension projections 5.

While conventional clamping plates can be used with the vamp and counter as described above, it is a particular feature of the present invention, to provide the clamping plates with U-shaped recesses, as shown in FIGS. 13–15. The clamping plate 10' is equipped with a central groove 16 extending longitudinally therein, and receiving the rubber of the vamp, thereby providing an added security against lateral movement of the vamp 2. The same arrangement can be made with the rear clamping plate 11', which likewise will be equipped with a groove 17 which receives the corresponding opposite portion to the counter 3. The clamping plates 10' and 11' are equipped with holes 18 and 19, respectively, to receive screw bolts which are screwed into the ski board 1. In addition, the clamping plates 10' and 11' may be equipped with male projections 20 and 21, respectively, which are received in corresponding female openings provided at the corresponding points on the vamp 2 and the counter 3, respectively. These male projections contribute further to a better securing of the vamp 2 and of the counter 3 on the ski board 1.

In order to prevent a cutting of the metal plates into the rubber of the vamp 2 and of the counter 3, respectively, sharp edges are avoided at the critical points and for this reason, the clamping plates 10' for securing the vamp 2 are equipped with rounded edges 22 and the clamping plate 11' for the counter has similar rounded edges 23; yet these rounded edges are confined to the critical points, where the danger of cutting exists.

Instead of mounting the binding directly on the ski, it is also possible to provide a base plate, on which the binding is mounted, an expedient known in connection with conventional skis.

The base plate proposed herein, however, follows the general shape of the binding, in order to reduce the weight thereof. Furthermore, the holes or slots which receive the screw bolts for securing the base plate to the ski, are formed as longitudinal slots, whereby an expansion and contraction of the ski boards in lateral and longitudinal direction is made possible. This arrangement prevents tearing of the wood, when the screw bolts are inserted, and also prevents splitting of the wood at the critical points. The screw slots disposed at the ends are arranged in longitudinal direction of the ski board, so that the slots prevent lateral movement, but permit longitudinal expansion. On the other hnad, the screw slots, which are disposed near the center of the plate at the sides, are disposed crosswise to the longitudinal axis of the ski board, thus, permitting lateral expansion, yet preventing a longitudinal movement thereof.

The combination of slots in longitudinal and crosswise direction permits a free expansion of the ski board either way, yet the plate will not edge or change its position, and it will remain permanently in its original location. The slot arrangement contributes also to a better engagement of the base plate on the top face of the ski board, if the ski board is slightly curved, the base plate would engage the board only at the ends. Due to the center slots being arranged crosswise, they pull the plate into engagement with the board, so that the base plate will be in complete engagement throughout its entire length with the ski board.

Referring now again to the drawings, and in particular to FIGS. 20 to 22, another embodiment is disclosed, which is identical with the first described embodiment and is equipped again with a vamp 2 and a counter 3, yet includes a base plate 24, being screwed to the ski board 1 by means of screw bolts 25, which extend through longitudinal slots 26, while the screw bolts 27 disposed intermediate the ends of the base plate 24, extend through crosswise disposed slots 28. The only difference between this embodiment and the first described embodiment resides in the arrangement of a ball chain 29 instead of the non-elastic cord, which ball chain can be shortened or lengthened by conventional means, by adding or taking off one or a plurality of balls from the operative length of the ball chain 29. The rear portion of the clamping plate 11 has a guide 30 secured to its rear end. In order to add or take off one or more balls from the ball chain 29, the end of the chain extends through a slot 31 of a locking plate and is then lowered into the lower portion, which is narrower than the diameter of the balls, thereby retaining the ball chain in the adjusted position.

Referring now to FIGS. 23 to 26, a variation of the vamp 2 is shown, namely, the vamp has again a thinner portion 2 as well as a thicker portion $2^a$, yet, from the thicker portion $2^a$, still an additional thinner portion $2^c$ extends tank-like rearwardly from the center of the thicker portion. The extension $2^c$ operates as a high tab and not only provides additional comfort and holding power, yet it is flexible enough to provide quick release of the foot. The high tab $2^c$ is substantially of the same thickness as the front or main portion of the vamp 2. Furthermore, the additional material in the high tab increases the resistance or force in the direction $F_2$ towards the shin bone and provides additional means for preventing the foot from slipping forward out of position, which would create a condition, whereby contact with the counter would be changed or decreased.

While I have disclosed several embodiments of the present invention, it is to be understood that these embodiments are given as example only and not in a limiting sense, the scope of the present invention being determined by the objects and the claims.

I claim:

1. A binding for water skis comprising
   an elastic flexible vamp member,
   a counter disposed behind said vamp member,
   both, said vamp and said counter being adapted to be mounted on a ski board,
   first clamping means securing the lateral edges of said vamp member to a ski board,
   second clamping means securing the lower edges of said counter to a ski board,
   said vamp member having at its rear end oppositely disposed tension projections, adapted to engage the instep of the foot of the user, and
   non-resilient cord means adjustably secured to the rearmost end of said tension projections and extending behind said counter.

2. The binding, as set forth in claim 1, wherein
   said vamp member has a rear zone of greater thickness than that of the front portion thereof, in order to provide a rear zone of lesser yielding around the instep of the user and a front zone of greater yielding and greater elasticity, in order to conform to the particular shape of the foot of the user, and to retain said vamp member at two fixed points defined by the rear end of said clamping means for said vamp member and by the forward end of said non-resilient cord means, when the latter is in operative position.

3. The binding, as set forth in claim 2, wherein
   said vamp member has a rearwardly and upwardly extending third zone of a thickness equal to that of said front zone,
   said third zone of said vamp member being adapted to prevent a forward slipping of the foot of the user in the binding.

4. The binding, as set forth in claim 1, wherein
   said cord means comprises a non-elastic cord, and means for varying the length of the operative portion of said cord.
5. The binding, as set forth in claim 1, wherein said cord means comprises a ball-chain, and means for varying the number of balls of said ball-chain for the operative portion thereof.
6. The binding, as set forth in claim 1, which includes a plurality of bolts disposed in longitudinal arrangement on the ski board behind said counter and receiving selectively said cord means.
7. The binding, as set forth in claim 1, wherein said clamping means for said vamp member terminate short of the forward end of said vamp member, to permit the toes of the user to extend forwardly from said vamp member.
8. The binding, as set forth in claim 1, wherein said first clamping means for said vamp member comprises a first clamping plate disposed on each lateral side of said vamp member,
said second clamping means for said counter comprises a substantially U-shaped, second clamping plate,
substantially the entire inner edge of each of said clamping plates being formed as a curved edge, and
the rearmost portions of said edges of said first clamping plates and the forwardmost portions of said second clamping plate having an inner curved edge portion of a greater diameter than that of the remaining inner edge portions.
9. The binding, as set forth in claim 1, wherein said clamping means for said vamp member and for said counter comprises a metal clamping bar having a longitudinal groove therein at the side engaging intermediate its edges said vamp member and said counter, respectively.
10. The binding, as set forth in claim 9, wherein said clamping bar has a plurality of male projections longitudinally spaced apart on said clamping bar, and
the opposite face of said vamp member and of said counter, respectively, has complementary openings receiving said male projections.
11. The binding, as set forth in claim 1, which includes a base plate having front and rear slots, disposed in longitudinal direction of the ski board, and intermediate slots disposed crosswise to the ski board, in order to permit working of the wood of the ski board in longitudinal and crosswise direction when being wet,
screw bolts extending through said slots for mounting said base plate on said ski board, and
said vamp member and said counter being secured to said base plate.
12. The binding, as set forth in claim 1, which includes guide means for said non-resilient cord means disposed at least laterally to said vamp member.

References Cited in the file of this patent
UNITED STATES PATENTS

| | | |
|---|---|---|
| 1,492,041 | Long | Apr. 29, 1924 |
| 2,327,783 | Hains | Aug. 24, 1943 |
| 2,740,972 | Taylor | Apr. 10, 1956 |
| 2,939,159 | Cravotta | June 7, 1960 |
| 2,988,761 | Dalpiaz | June 20, 1961 |
| 3,089,158 | Powers | May 14, 1963 |

FOREIGN PATENTS

| | | |
|---|---|---|
| 189,978 | Austria | May 25, 1957 |
| 538,323 | Italy | Jan. 23, 1956 |